(12) United States Patent
Holmqvist et al.

(10) Patent No.: US 12,468,297 B2
(45) Date of Patent: Nov. 11, 2025

(54) VALIDATION OF CONNECTION OF A REMOTELY OPERABLE VEHICLE

(71) Applicant: Einride AB, Stockholm (SE)

(72) Inventors: Sebastian Holmqvist, Stockholm (SE); Simon Andersson, Stockholm (SE); Per Hallgren, Stockholm (SE); Alexandre Weffort Thenorio, Stockholm (SE)

(73) Assignee: Einride Autonomous Technologies AB, Stockholm (SE)

( * ) Notice: Subject to any disclaimer, the term of this patent is extended or adjusted under 35 U.S.C. 154(b) by 266 days.

(21) Appl. No.: 18/451,987

(22) Filed: Aug. 18, 2023

(65) Prior Publication Data
US 2024/0061421 A1 Feb. 22, 2024

(30) Foreign Application Priority Data
Aug. 18, 2022 (EP) .................................. 22191042

(51) Int. Cl.
*B60W 50/02* (2012.01)
*B60W 60/00* (2020.01)
*G05D 1/00* (2006.01)
*H04L 67/12* (2022.01)

(52) U.S. Cl.
CPC ....... *G05D 1/0038* (2013.01); *B60W 50/0205* (2013.01); *B60W 60/001* (2020.02); *B60W 2050/021* (2013.01); *B60W 2050/0215* (2013.01); *B60W 2556/45* (2020.02); *H04L 67/12* (2013.01)

(58) Field of Classification Search
CPC ...... G05D 1/0038; G05D 1/00; G05D 1/0011; G05D 1/2247; G05D 1/226; G05D 1/2274; B60W 60/001; B60W 50/0205; B60W 2050/021; B60W 2050/0215; G06T 7/0002; G07C 5/008
See application file for complete search history.

(56) References Cited

U.S. PATENT DOCUMENTS

2020/0244951 A1\* 7/2020 Holloway ............... H04N 23/54
2022/0147042 A1 5/2022 Trank et al.

FOREIGN PATENT DOCUMENTS

WO 2019180700 A1 9/2019

OTHER PUBLICATIONS

European Search Report and Written Opinion dated Jan. 10, 2023 received in European Patent Application No. EP 22191042.5.

\* cited by examiner

Primary Examiner — Benyam Haile
(74) Attorney, Agent, or Firm — SCULLY, SCOTT, MURPHY & PRESSER, P.C.

(57) ABSTRACT

An apparatus including an indicator and a video sensor arranged to generate sensor data dependent on a state of the indicator, control circuitry configured to select the state of the indicator, to process instructions received in the apparatus from a remote driving station, to provide to the remote driving station the sensor data and to at least one of: provide to the remote driving station an indication of the indicator's selected state to enable the remote driving station to detect a malfunction in the sensor data, and obtain an observation of the state of the indicator, based on the sensor data, and determine whether the observation and the selected state of the indicator are consistent, to detect a malfunction in the sensor data, wherein the apparatus is a remotely operated vehicle, or configured to be installed in one.

20 Claims, 7 Drawing Sheets

VALIDATION OF CONNECTION OF A REMOTELY OPERABLE VEHICLE

CROSS-REFERENCE TO RELATED APPLICATION

The present disclosure claims priority under 35 U.S.C. § 119 to European Patent Application No. EP 22191042, filed on Aug. 18, 2022. The entire disclosure of European Patent Application No. EP 22191042 is incorporated by reference.

FIELD

The present disclosure relates to dependability of remote control, such as remote driving, systems.

BACKGROUND

Remote operation of vehicles provides several benefits as the need of having a human present at or inside the vehicle is removed. As automation in the automotive and trucking industry increases there are many benefits of separating a driver from the vehicle. In trucking and logistics, drivers have legal requirements for taking breaks and hours they can work during the day. By separating the drivers from trucks, restrictions placed on drivers can be separated from the usability of the trucks themselves. Additionally, as automation of driving advances, there are times where an autonomous system is not capable of efficiently operating on its own and would benefit from human input. In this sense there are advantages to have vehicles with both an autonomous driving mode and a remote operated driving mode.

There are even further benefits such as in case the environment where the vehicle operates is inhospitable, as is the case for planetary rovers, bomb disarming vehicles and vehicles furnished with nuclear reactor maintenance devices, or simply due to distance.

In particular, remotely operated vehicles enable, for example, freight carrying vehicles which do not place a human driver at risk of a traffic accident.

SUMMARY

According to some aspects, there is provided the subject-matter of the independent claims. Some embodiments are defined in the dependent claims.

According to a first aspect of the present disclosure, there is provided an apparatus comprising a configurable visual indicator and a video sensor arranged to generate a sensor data stream which is dependent on a state of the configurable visual indicator, control circuitry configured to select the state of the configurable visual indicator, to process operating instructions received in the apparatus from a remote driving station, to provide to the remote driving station the sensor data stream and to at least one of: provide to the remote driving station an indication of the selected state of the configurable visual indicator, to enable the remote driving station to detect a malfunction in the sensor data stream, and obtain an observation of the state of the configurable visual indicator, based on the sensor data stream, and determine whether the observation and the selected state of the configurable visual indicator are consistent, to detect a malfunction in the sensor data stream, wherein the apparatus is a remotely operated vehicle, or is configured to be installed in a remotely operated vehicle.

According to a second aspect of the present disclosure, there is provided an apparatus comprising at least one processing core, at least one memory including computer program code, and the computer program code being configured to, with the at least one processing core, cause the apparatus at least to perform as a remote driving station to a remotely operated vehicle by providing operating instructions to the remotely operated vehicle, receive from the remotely operated vehicle a sensor data stream, render the sensor data stream on a display and at least one of: receive an indication of a selected state of a configurable visual indicator in the remotely operated vehicle, provide a visual signal based on the indication of the selected state of the configurable visual indicator, to enable an operator to detect a malfunction in the sensor data stream, the sensor data stream being dependent on an actual state of the configurable visual indicator, and image at least a part of the display to generate image data, digitize the image data and provide to the remotely operated vehicle an indication of the digitization.

According to a third aspect of the present disclosure, there is provided a method comprising operating, in an apparatus, a configurable visual indicator and a video sensor arranged to generate a sensor data stream which is dependent on a state of the configurable visual indicator, selecting the state of the configurable visual indicator, processing operating instructions received in the apparatus from a remote driving station, providing to the remote driving station the sensor data stream and at least one of: firstly, providing to the remote driving station an indication of the selected state of the configurable visual indicator, to enable the remote driving station to detect a malfunction in the sensor data stream, and secondly, obtaining an observation of the state of the configurable visual indicator, based on the sensor data stream, and determining whether the observation and the selected state of the configurable visual indicator are consistent, to detect a malfunction in the sensor data stream, wherein the apparatus is a remotely operated vehicle, or is configured to be installed in a remotely operated vehicle.

According to a fourth aspect of the present disclosure, there is provided a method comprising performing, by an apparatus, as a remote driving station to a remotely operated vehicle by providing operating instructions to the remotely operated vehicle, receiving from the remotely operated vehicle a sensor data stream, rendering the sensor data stream on a display and at least one of: firstly, receiving an indication of a selected state of a configurable visual indicator in the remotely operated vehicle, providing a visual signal based on the indication of the selected state of the configurable visual indicator, to enable an operator to detect a malfunction in the sensor data stream, the sensor data stream being dependent on an actual state of the configurable visual indicator, and secondly, imaging at least a part of the display to generate image data, digitizing the image data and providing to the remotely operated vehicle an indication of the digitization.

According to a fifth aspect of the present disclosure, there is provided a non-transitory computer readable medium having stored thereon a set of computer readable instructions that, when executed by at least one processor, cause an apparatus to at least operate a configurable visual indicator and a video sensor arranged to generate a sensor data stream which is dependent on a state of the configurable visual indicator, select the state of the configurable visual indicator, process operating instructions received in the apparatus from a remote driving station, provide to the remote driving station the sensor data stream and at least one of: firstly, provide to the remote driving station an indication of the selected state of the configurable visual indicator, to enable the remote driving station to detect a malfunction in the sensor data stream, and secondly, obtain an observation of the state of the configurable visual indicator, based on the sensor data stream, and determine whether the observation and the selected state of the configurable visual indicator are consistent, to detect a malfunction in the sensor data stream, wherein the apparatus is a remotely operated vehicle, or is configured to be installed in a remotely operated vehicle.

According to a sixth aspect of the present disclosure, there is provided a non-transitory computer readable medium having stored thereon a set of computer readable instructions that, when executed by at least one processor, cause an apparatus to at least perform as a remote driving station to a remotely operated vehicle by providing operating instructions to the remotely operated vehicle, receive from the remotely operated vehicle a sensor data stream, render the sensor data stream on a display and at least one of: firstly, receive an indication of a selected state of a configurable visual indicator in the remotely operated vehicle, provide a visual signal based on the indication of the selected state of the configurable visual indicator, to enable an operator to detect a malfunction in the sensor data stream, the sensor data stream being dependent on an actual state of the configurable visual indicator, and secondly, image at least a part of the display to generate image data, digitize the image data and provide to the remotely operated vehicle an indication of the digitization.

DETAILED DESCRIPTION

Using methods disclosed herein, dependability of remote operation may be enhanced by including in a sensor data stream originating in a remotely controlled vehicle information enabling checking, if the sensor data stream, such as a video stream, for example, is experiencing issues. Examples of issues include freezing, delay, quality and jitter. Three embodiments are disclosed, which may be used separately or in any combination in the same remotely operated vehicle, for example relating to distinct sensor data streams originating in the vehicle. Additionally, elements and aspects from the embodiments can be exchanged and combined between the embodiments.

Figure 1:
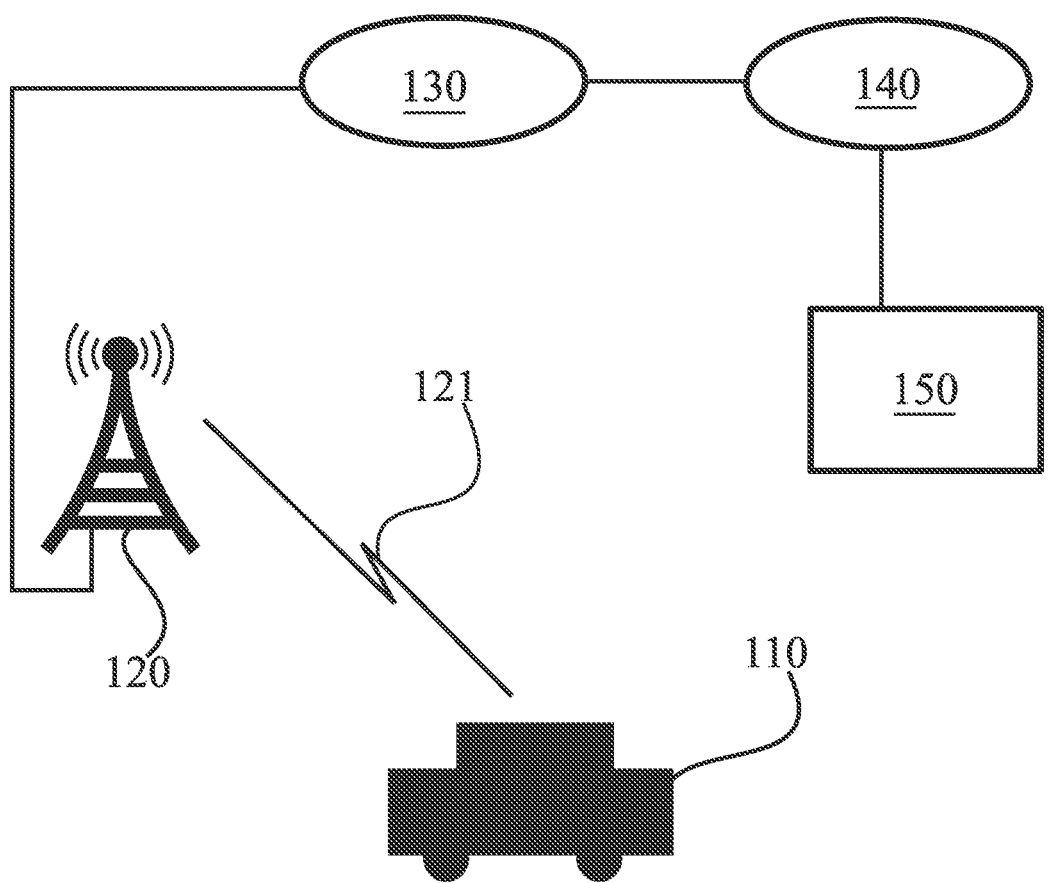
FIG. 1 illustrates an example system in accordance with at least some embodiments of the present invention.

FIG. 1 illustrates an example system in accordance with at least some embodiments of the present invention. Remotely operated vehicle 110 is at least in part operated remotely from remote driving station 150. Remotely operated vehicle 110 will be referred to herein as vehicle 110 for the sake of brevity. By being remotely operated it is herein meant that at least a part of the control of vehicle 110 takes place from remote driving station 150. There may be humans in vehicle 110, including a human participating in controlling vehicle 110, but vehicle 110 is configured to be responsive concerning at least a part of its control inputs to operating instructions received in vehicle 110 from remote driving station 150. For example, vehicle 110 may have a brake that a human in vehicle 110 may trigger to cause the vehicle to stop, with other control aspects such as speed, steering and operation of headlights being responsive to the operating instructions received from remote driving station 150. In other words, vehicle 110 may be partly controlled locally from vehicle 110 and partly from remote driving station 150. Vehicle 110 may also have no humans aboard at all and/or vehicle 110 may be completely controlled from remote driving station 150.

Vehicle 110 may comprise a car, such as a taxi, a van, a truck or a tractor unit for a trailer. Alternatively, vehicle 110 may comprise hazardous-purpose vehicle such as a nuclear reactor maintenance buggy or bomb disposal vehicle.

As vehicle 110 is mobile, it may be configured to communicate with remote driving station 150 using, at least partly, wireless communication. In the example of FIG. 1, vehicle 110 is furnished with a cellular communication module configured to participate in a wireless link 121 with base station 120. Wireless link 121 and base station 120 are configured to function based on a cellular communication standard, such as long term evolution, LTE, or fifth generation, 5G, as specified by the 3rd generation partnership project, 3GPP. An advantage of cellular systems is their great range as they can provide an uninterrupted connection to a vehicle roaming even internationally. On the other hand if less mobility is needed, a non-cellular wireless communication system may be used, such as wireless local area network, WLAN, or worldwide interoperability for microwave access, WiMAX. In some embodiments, satellite-based communication may be employed additionally or alternatively to terrestrial communication links, such as cellular or non-cellular links. Networks 130 and 140 may, in some embodiments, be traversed by a communication path between vehicle 110 and remote driving station 150.

In some embodiments, instead of a wireless connection, a wired connection between vehicle 110 and remote driving station 150 may be used. For example, in case the range of mobility of vehicle 110 is limited, a wired connection may be appropriate. Advantages of a wired connection include fast data rate, low latency and low risk of an interrupted connection. In some embodiments with limited range of vehicle 110, a direct wireless connection from remote driving station 150 to vehicle 110 may be used.

As a vehicle may move around on public streets, or in other embodiments interact with hazardous materials, dependability of remote operation is of considerable interest. In detail, a sensor data stream, such as a video stream, from vehicle 110 should have sufficient quality to enable a remote driver or remote driver system to recognize traffic signs and pedestrians, for example. Likewise, the sensor data stream should have a latency sufficiently low to enable fast reactions from remote driving station 150 to surprising developments in the driving environment. In general, remote driving station 150 may house a human remote driver, and/or an automated, at least partially autonomous driving algorithm. In some embodiments, a human remote driver is assisted by a driving algorithm.

Figure 2A:
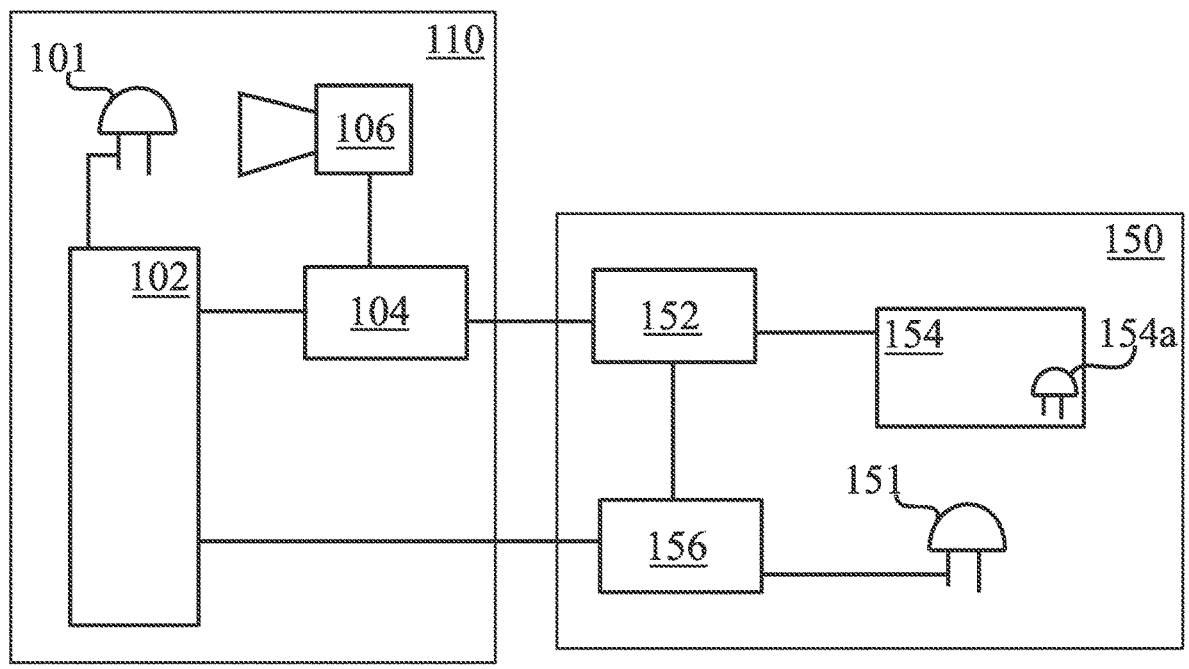
FIG. 2A illustrates an example system in accordance with at least some embodiments of the present invention.

FIG. 2A illustrates an example system in accordance with at least some embodiments of the present invention. The figure illustrates vehicle 110 and remote driving station 150 of FIG. 1 in more detail. Vehicle 110 comprises control circuitry 102, a configurable visual indicator 101, such as a light-emitting diode, LED, or another kind of light source, streamer 104 and video sensor 106. Video sensor 106 may comprise, for example, a video camera arranged to image a view through a windscreen of vehicle 110, as well as configurable visual indicator 101. Remote driving station 150 comprises a player 152, a display 154, controller 156 and configurable visual indicator 151. Configurable visual indicator 101 may comprise, alternatively or additionally to a light source, a mechanical element, such as windscreen wiper, arranged to provide the visual indication by changing its place and/or orientation, to be imaged by video sensor 106. Yet further, the configurable visual indicator 101 may comprise a mechanism that controls the orientation of video sensor 106 itself, for example by turning video sensor 106 from a first orientation to a second orientation, and back.

In use, control circuitry 102 controls a state of configurable visual indicator 101 by switching it between states, such as on and off, for example according to a random, pseudo-random, or deterministic but specially crafted pattern. In other words, control circuitry 102 may be configured to repeatedly select the state of configurable visual indicator 101. As configurable visual indicator 101 is within the field of view of video sensor 106, the state of configurable visual indicator 101 is captured into a sensor data stream generated by video sensor 106 as a visual element, along with other objects within the field of view of video sensor 106.

Streamer 104 provides the sensor data stream to remote driving station 150, such that streamer provides to remote driving station 150 also an indication of the selected state of the configurable visual indicator, for example as metadata of the sensor data stream, or otherwise in connection with providing the sensor data stream.

At the remote driving station, player 152 controls display 154 based on the sensor data stream to render on display 154 the view imaged by video sensor 106, such that an image 154a of configurable visual indicator 101 is visible on display 154 when the sensor data stream is rendered there. Controller 156 separately controls configurable visual indicator 151 based on the indication of the selected state of configurable visual indicator 101, such that when the connection between vehicle 110 and remote driving station 150 is functioning well and the sensor data stream is not frozen, configurable visual indicator 151 and image 154a should have the same, or corresponding, state. An example of a corresponding state is one where changes in states of image 154a and configurable visual indicator 151 satisfy a delay requirement. Operating instructions are provided from remote driving station 150 to vehicle 110 to remotely operate the vehicle.

An operator of remote driving station 150 may, when remotely operating vehicle 110, detect problems with the sensor data stream when image 154a and configurable visual indicator 151 have different states. Vehicle 110 may then be instructed to stop, for example.

More specifically, control circuitry 102 may provide to streamer 104 an identity of vehicle 110 and/or a timestamp in addition to the indication of the selected state of configurable visual indicator 101. These data may be provided in a data structure, which may be input to a checksum algorithm, the resulting checksum also being provided to streamer 104, for delivery to remote driving station 150, for example embedded as metadata in the sensor data stream. Remote driving station 150 may extract the identity and/or timestamp, and provide a copy or copies of these back to vehicle 110 in connection with providing the operating instructions for implementing the remote driving. Control circuitry 102 may then check that the identity received from remote driving station 150 matches the identity of vehicle 110 provided to the remote driving station, and/or that the timestamp received is not too old compared to the present time. These checks enable detecting error scenarios where vehicle 110 is provided operating instructions of another vehicle (identity), and/or where communications between vehicle 110 and remote driving station 150 has excessive delay (timestamp). In either error case, vehicle 110 may be configured to stop, for example. Both remote driving station 150 and vehicle 110 may verify checksums calculated over information communicated to them by the other party, to detect bit errors in the information. Remote driving station 150 may also be configured to provide the indication of the selected state of configurable visual indicator 101 back to vehicle 110, for example together with the operating instructions.

These mechanisms are capable of detecting freezing and significant delays of the sensor data stream, be these due to video sensor 106, streamer 104, player 152, display 154 or the connection between vehicle 110 and remote driving station 150. Tampering of the connection may be detected using normal cryptographic methods between vehicle 110 and remote driving station 150. Bit errors in communicated information may be detected from the verification of checksums. As noted, sending operating instructions to a wrong vehicle can also be prevented from influencing actual operation of vehicle 110.

Figure 2B:
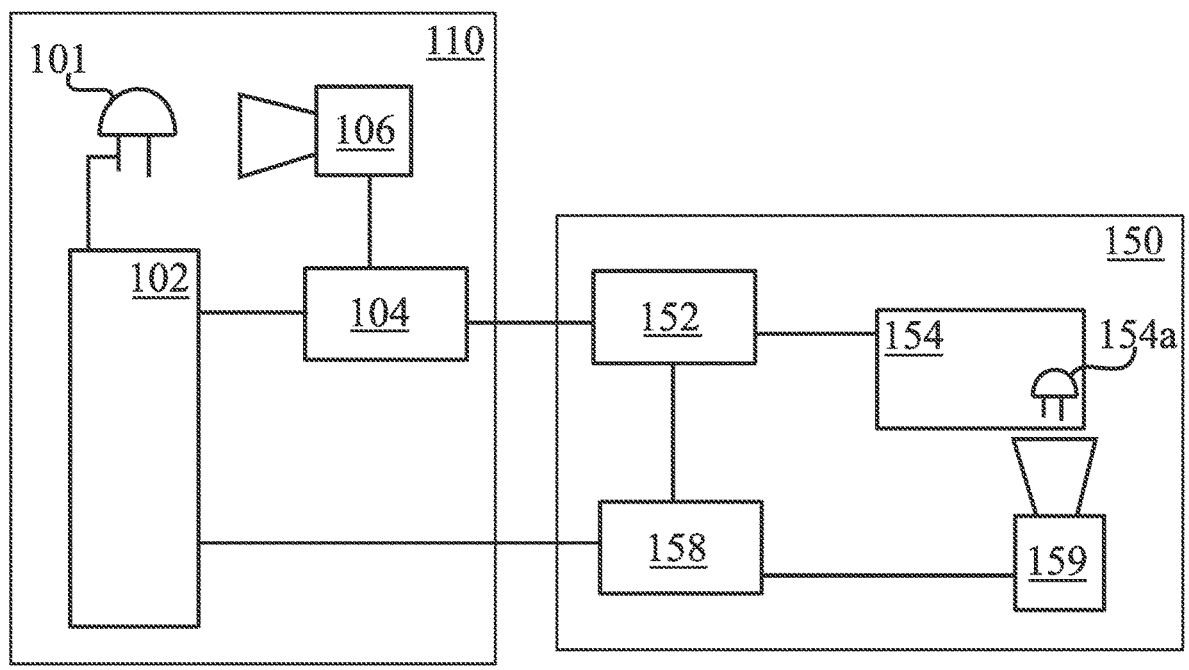
FIG. 2B illustrates an example system in accordance with at least some embodiments of the present invention.

FIG. 2B illustrates an example system in accordance with at least some embodiments of the present invention. The system of FIG. 2B resembles that of FIG. 2A, an indeed like numbering denotes like structure as in FIG. 2A. Different from FIG. 2A, remote driving station 150 comprises, instead of controller 156 and configurable visual indicator 151, a scanner 158 and video sensor 159. Video sensor 159 is configured to monitor image 154a of configurable visual indicator 101. In use, control circuitry 102 controls a state of configurable visual indicator 101 by switching it on and off, for example according to a random or pseudo-random pattern, as in FIG. 2A. The sensor data stream from vehicle 110 is rendered in remote driving station 150 to display 154, as was the case in the system of FIG. 2A.

In the solution of FIG. 2B, remote driving station 150 scans an output of video sensor 159 to determine, what is the state of image 154a. This state is then included in the information provided back to vehicle 110, for example in connection with providing the operating instructions to vehicle 110. Vehicle 110 then compares the state received from remote driving station 150 to the state selected by control circuitry 102 for configurable visual indicator 101. Thus vehicle 110 is enabled to detect if the two-way communication between itself and remote driving station 150 is sufficiently fast and delay-free for dependable and safe remote control of vehicle 110. If there is a mismatch between the selected state of configurable visual indicator 101 and the state received from remote driving station 150, vehicle 110 may be configured to stop. Advantageously in the system of FIG. 2B, a human operator need not remain vigilant to detect the mismatch, as was the case in the system of FIG. 2A.

In some embodiments, vehicle 110 is configured to measure a round-trip delay in communication between vehicle 110 and remote driving station 150 by changing the selected state of configurable visual indicator 101, and then determining how much time elapses before the new selected state is present in the state received back from remote driving station 150. This delay value may be provided to remote driving station 150, which may display it to a human operator to enhance his awareness of the remote operation situation. For example, responsive to an increase in the delay value, the human operator may decrease a maximum speed of vehicle 110, to give himself more time to respond to changes in the driving environment. When remote driving station 150 does not have a human operator, the delay value may be provided to a remote driving algorithm, which may use it as one of its inputs. For example, the remote driving algorithm may reduce the speed of vehicle 110 as a response to the delay increasing, to provide more time to respond to changes in the driving environment.

Compared to the system of FIG. 2A, the system of FIG. 2B provides the effect that vehicle 110 is enabled to respond to the delay value determined between itself and remote driving station 150. Further, no human is needed in the loop and measurement of the delay value is enabled, as described above. Freezing and significant delays of the video stream, be it in the video sensor, streamer, player or display, will be detectable by the vehicle's check. As was the case in FIG. 2A, vehicle 110 may provide to remote driving station 150, for example as metadata in the sensor data stream, an identity of vehicle 110 and/or a timestamp, which remote driving station 150 provides back to vehicle 110 in connection with providing the operating instructions, to enable detection of operating instructions sent to a wrong vehicle, and/or determination of whether the timestamps received in return from remote driving station 150 are too old.

Figure 2C:
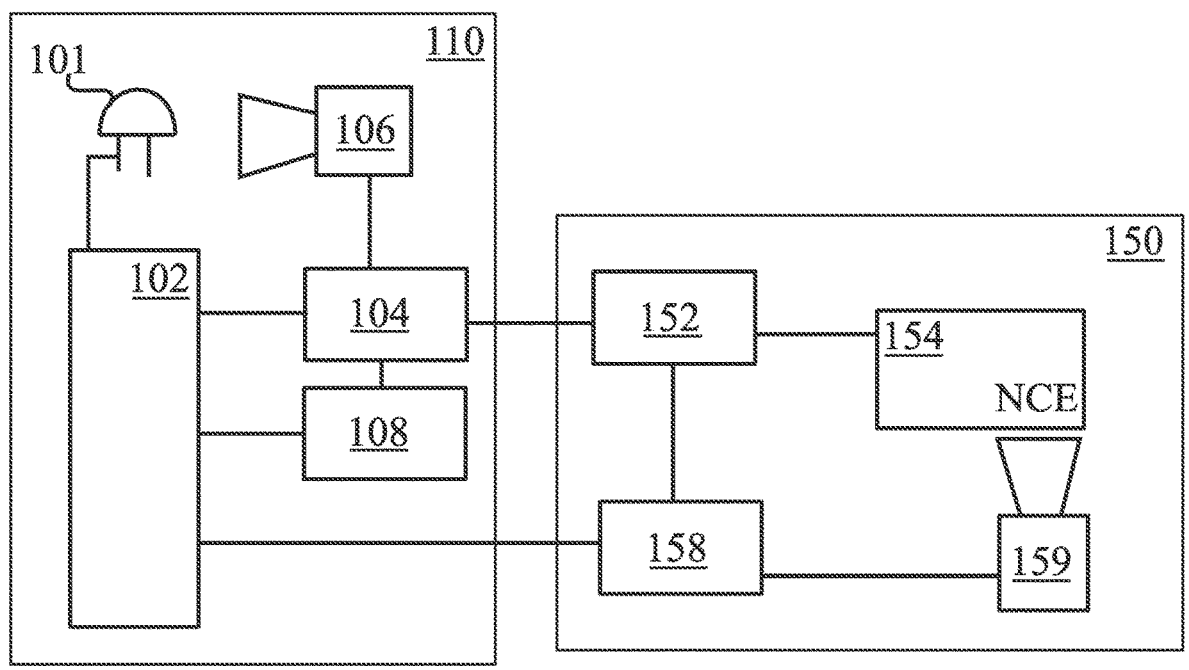
FIG. 2C illustrates an example system in accordance with at least some embodiments of the present invention.

FIG. 2C illustrates an example system in accordance with at least some embodiments of the present invention. The system of FIG. 2C resembles that of FIG. 2B, an indeed like numbering denotes like structure as in FIG. 2B. In use, control circuitry 102 controls a state of configurable visual indicator 101 by switching it on and off, for example according to a random or pseudo-random pattern.

In the system of FIG. 2C, the sensor data stream from video sensor 106 is scanned in scanner 108 of vehicle 110, to detect the state of configurable visual indicator 101 in the sensor data stream in vehicle 110 itself, without involving remote driving station 150 in the detection. Scanner 108 provides the scanned state to control circuitry 102, to enable control circuitry 102 to detect error states in the sensor data stream locally in vehicle 110, before the sensor data stream is provided to remote driving station 150. In case there is a divergence between the selected state of configurable visual indicator 101 and the detected state of configurable visual indicator 101 in the sensor data stream, vehicle 110 may be configured to stop, for example, as the sensor data stream is unreliable. Although illustrated in FIG. 2C as traversing streamer 104, the connection between scanner 108 and video sensor 106 need not traverse streamer 104 and may be direct. Vehicle 110 provides to remote driving station 150 the sensor data stream, which is modified in its payload content to include embedded as a visual element in the stream a nonce selected by vehicle 110, selected for example by control circuitry 102. The nonce may be changed several times during use, for example according to a random or pseudo-random pattern. At the remote driving station, the nonce NCE is rendered on display 154 as a visual element from the sensor data stream, and captured by video sensor 159 of the remote driving station. The nonce from video sensor 159 is scanned in scanner 158 and provided back to vehicle 110, to enable vehicle 110 to monitor the quality of the connection between itself and the remote driving station, as was the case in FIG. 2B and the state of the configurable visual indicator 101. Vehicle 110 may store a sequence of past nonces, to enable determining a length of communication delay in case the nonce received from remote driving station 150 does not match the current nonce.

As was the case in FIGS. 2A and 2B, vehicle 110 may provide to remote driving station 150, for example as metadata in the sensor data stream or otherwise associated with the sensor data stream, an identity of vehicle 110 and/or a timestamp, which remote driving station 150 provides back to vehicle 110 in connection with providing the operating instructions, to enable detection of operating instructions sent to a wrong vehicle, and/or determination of whether the timestamps received in return from remote driving station 150 is too old. Checksums may be used in both directions to detect bit errors in the communicated information, also like the systems of FIGS. 2A and 2B.

In general concerning FIGS. 2A, 2B and 2C, the process of remote control of vehicle 110 may proceed in a continuous manner, where the sensor data stream from vehicle 110 is continuously provided to remote driving station 150, and the operating instructions likewise provided as a continuous stream from remote driving station 150 to vehicle 110. Further in general, the elements described above in the systems of FIGS. 2A, 2B and 2C may be implemented as hardware, software or combinations of hardware and software. Further, certain ones of the elements illustrated as distinct in the figures for the same of clarity may be implemented as a single physical integrated chip and/or software executable, as applicable.

Figure 3:
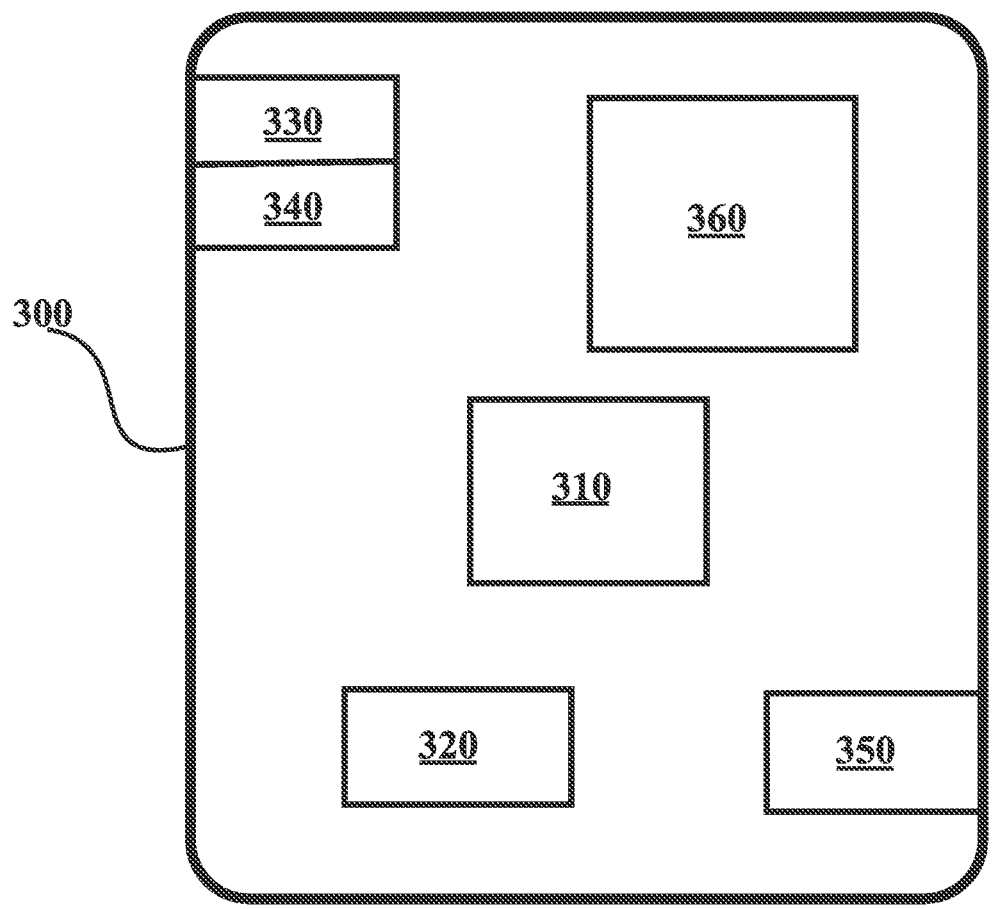
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, in applicable parts, vehicle 110 or a controller thereof of FIG. 1, or the remote driving station 150 or a controller thereof. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one AMD Opteron and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one suitable communication standard. Transmitter 330 may comprise more than one transmitter. Receiver 340 may comprise more than one receiver. Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure remote operation parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some embodiments, device 300 lacks at least one device described above. For example, some devices 300 may lack an NFC transceiver 350.

Processor 310, memory 320, transmitter 330, receiver 340, NFC transceiver 350 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
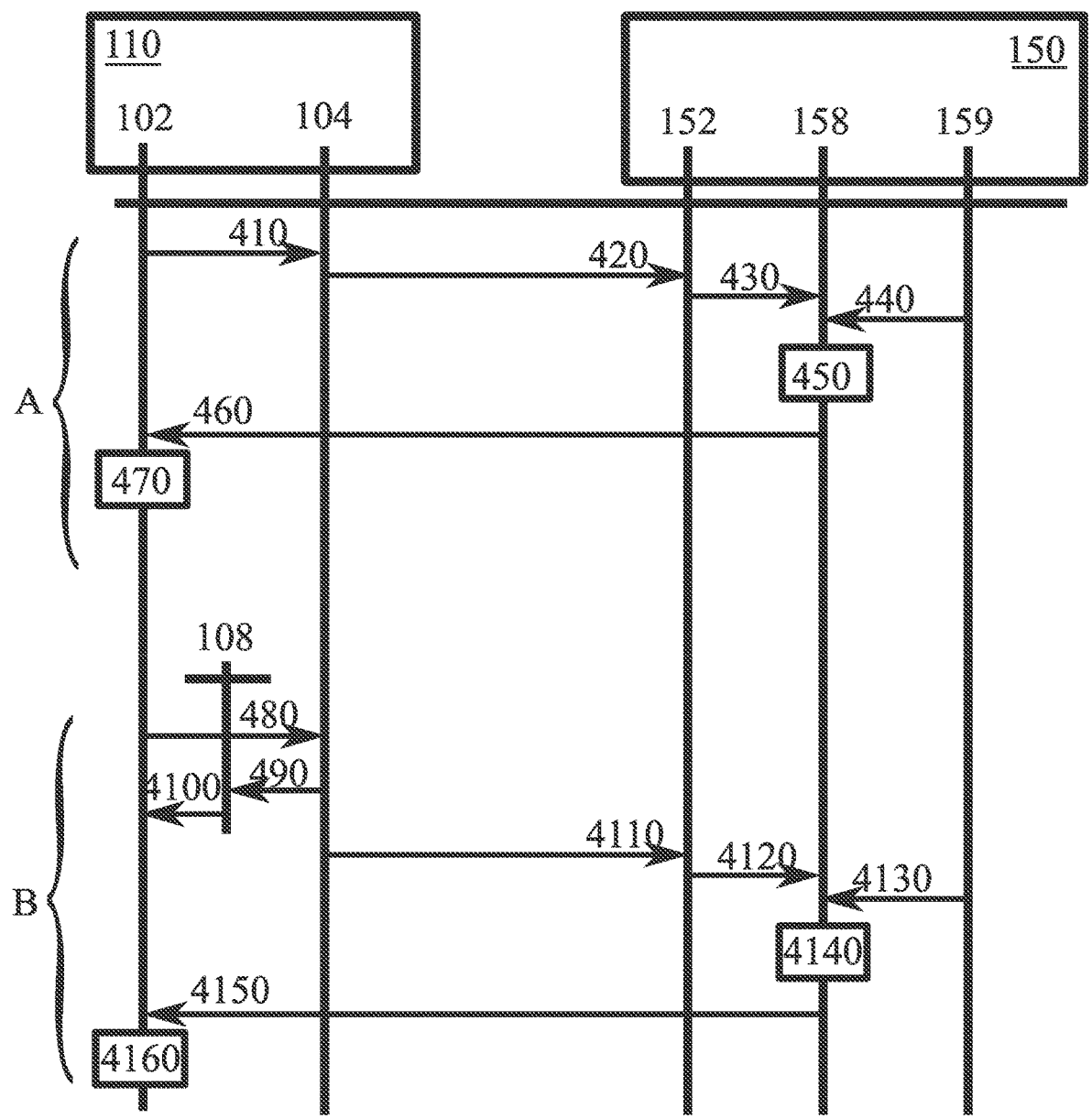
FIG. 4 illustrates signaling in accordance with at least some embodiments of the present invention.

FIG. 4 illustrates signaling in accordance with at least some embodiments of the present invention. Two separate processes A and B are illustrated. On the vertical axes are disposed, on the left, vehicle 110 of FIGS. 2A, 2B and 2C and its control circuitry 102 and streamer 104, and on the right, remote driving station 150 of FIGS. 2A, 2B and 2C and its player 152, scanner 158 and video sensor 159. Time advances from the top toward the bottom.

In process A, corresponding to FIG. 2B, in phase 410 control circuitry 102 provides to streamer 104 metadata for the sensor data stream of vehicle 110. Streamer 104, in the example of FIG. 4, embeds the metadata received in phase 410 as metadata of the sensor data stream from video sensor 106, and provides the sensor data stream to remote driving station 150, to player 152, phase 420. Player 152 renders the stream onto the display of remote driving station, which video sensor 159 is arranged to image, as described herein above. Continuing the process, video sensor 159 provides its sensor data stream to scanner 158, and player 152 provides the metadata of the sensor data stream received from vehicle 110 to scanner 158 as well, phase 430. Scanner 158 determines, phase 450, based on the sensor data stream from video sensor 159, which state configurable visual indicator 101 has in the sensor data stream received from vehicle 110, and provides it to control circuitry 102 of vehicle 110 in phase 460. Phase 460 may also comprise the provision of operating instructions for vehicle 110 from remote driving station 150. In phase 470, control circuitry 102 of vehicle 110 determines whether the state of configurable visual indicator 101 as received from remote driving station 150 in phase 460 is the same as the one selected in control circuitry 102, or at least within a tolerable delay of the selected one. As a variant, the metadata of phase 430 may proceed to the display of remote driving station 150, and be read from there by video sensor 159, to then be provided to scanner 158.

As described above, in some embodiments the metadata provided for the sensor data stream of vehicle 110, phase 410, comprises an identity of vehicle 110 and/or a timestamp assigned by control circuitry 102. In these embodiments, the identity of vehicle 110 and/or the timestamp are provided back to vehicle 110 in phase 460, to enable control circuitry 102 to check the operating instructions are for vehicle 110 and not another vehicle, and/or that the timestamp is sufficiently fresh to guarantee the round-trip communication delay is not excessive. In some embodiments where the identity of vehicle 110 and/or the timestamp are not provided from vehicle 110, the metadata of phases 410 and 430 may be absent.

In process B, corresponding to FIG. 2C, in phase 480 control circuitry 102 provides to streamer 104 metadata for the sensor data stream of vehicle 110, the metadata comprising a nonce. In phase 490 streamer 104 provides the sensor data stream of the video sensor of vehicle 110 to scanner 108, which detects the state of configurable visual indicator 101 from the sensor data stream of the video sensor of vehicle 110, and provides, phase 4100, this state to control circuitry 102, to enable the control circuitry to check, whether the sensor data stream functions adequately inside vehicle 110, as described herein above.

In phase 4110, streamer 104 provides the sensor data stream of vehicle 110, into which the nonce has been embedded as a visual item in the payload, to remote driving station 150, in particular to player 152, which renders the sensor data stream onto the display of remote driving station 150. Player 152 provides metadata of the sensor data stream, if any, to scanner 158 in phase 4120, and video sensor 159 provides its sensor data stream to scanner 158 in phase 4130. In phase 4140, scanner 158 determines the nonce by scanning, that is digitizing and image-recognizing, at least a part of the sensor data stream from video sensor 159. In phase 4150, the nonce obtained by scanner 158 from the sensor data stream of video sensor 159 is provided to vehicle 110 along with operating instructions for vehicle 110. In phase 4160, control circuitry 102 may check it is the same nonce as the one provided to streamer 104 in phase 480, or at least a nonce issued within a tolerable delay to the most recently issued nonce. As a variant, the metadata of phase 4110 may proceed to the display of remote driving station 150, and be read from there by video sensor 159, to then be provided to scanner 158.

As described above, in some embodiments the metadata provided for the sensor data stream of vehicle 110, phase 480, comprises an identity of vehicle 110 and/or a timestamp assigned by control circuitry 102. In these embodiments, the identity of vehicle 110 and/or the timestamp are provided back to vehicle 110 in phase 4150, to enable control circuitry 102 to check the operating instructions are for vehicle 110 and not another vehicle, and/or that the timestamp is sufficiently fresh to guarantee the round-trip communication delay is not excessive. Likewise in these embodiments, the timestamp and/or identity of the vehicle are provided directly from player 152 to scanner 158, rather than via the display. Control circuitry 102 may vary the nonce in a random or pseudorandom manner, for example, in a timescale which enables characterizing the round-trip delay in communications between vehicle 110 and remote driving station 150.

Figure 5:
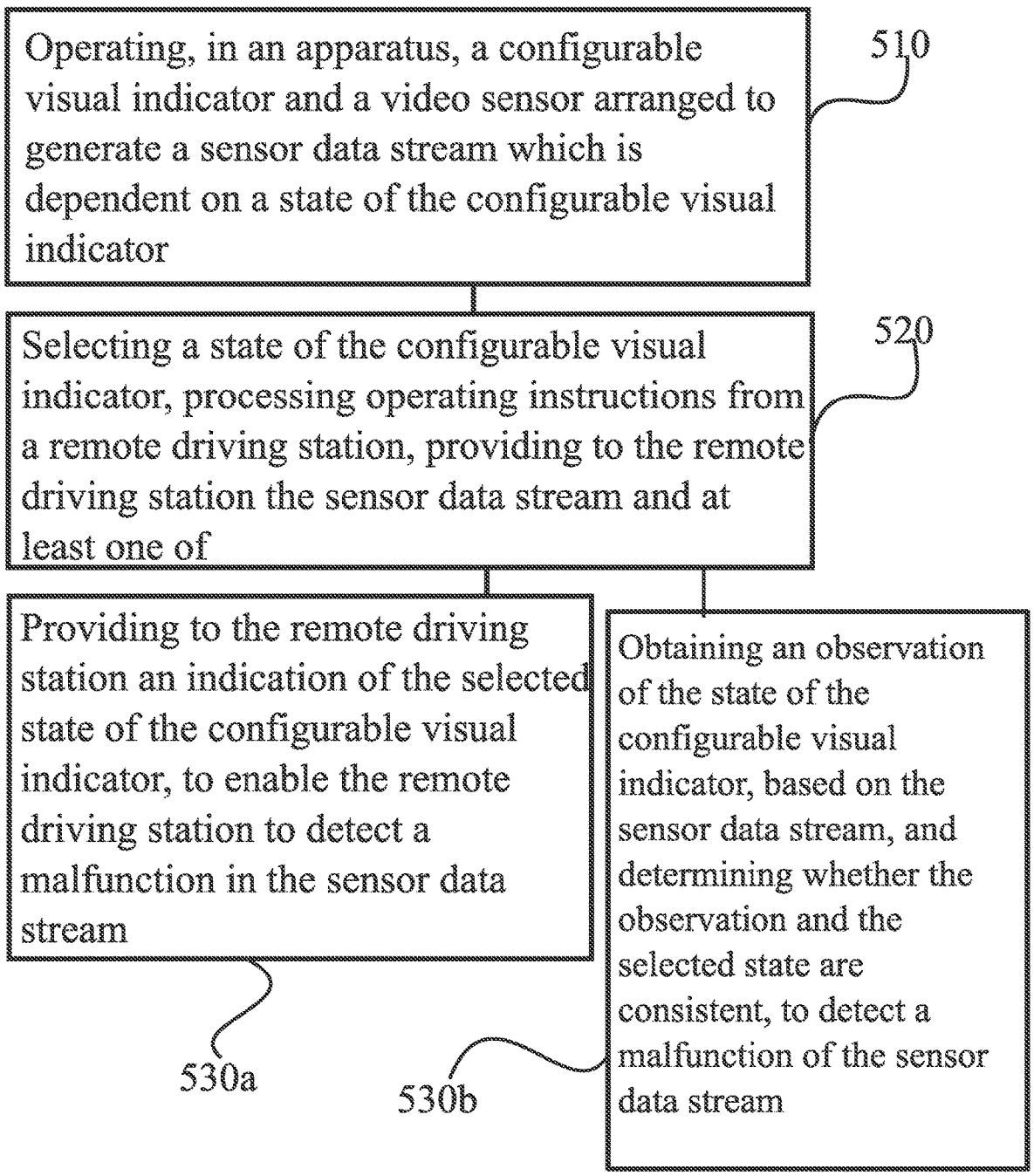
FIG. 5 is a flow graph of a method in accordance with at least some embodiments of the present invention.

FIG. 5 is a flow graph of a method in accordance with at least some embodiments of the present invention. The phases of the illustrated method may be performed in vehicle 110, or in a control device configured to control the functioning thereof, when installed therein.

Phase 510 comprises operating, in an apparatus, a configurable visual indicator and a video sensor arranged to generate a sensor data stream which is dependent on a state of the configurable visual indicator. Phase 520 comprises selecting the state of the configurable visual indicator, processing operating instructions received in the apparatus from a remote driving station, providing to the remote driving station the sensor data stream and at least one of: firstly, phase 530a, providing to the remote driving station an indication of the selected state of the configurable visual indicator, to enable the remote driving station to detect a malfunction in the sensor data stream, and secondly, phase 530b, obtaining an observation of the state of the configurable visual indicator, based on the sensor data stream, and determining whether the observation and the selected state of the configurable visual indicator are consistent, to detect a malfunction in the sensor data stream, wherein the apparatus is a remotely operated vehicle, or is configured to be installed in a remotely operated vehicle.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated.

Furthermore, it is to be understood that the use of "a" or "an", that is, a singular form, throughout this document does not exclude a plurality.

INDUSTRIAL APPLICABILITY

At least some embodiments of the present invention find industrial application in remote operation of vehicles.

Technical Clauses:

Clause 1. An apparatus comprising:
  a configurable visual indicator and a video sensor arranged to generate a sensor data stream which is dependent on a state of the configurable visual indicator;
  control circuitry configured to select the state of the configurable visual indicator, to process operating instructions received in the apparatus from a remote driving station, to provide to the remote driving station the sensor data stream and to at least one of:
    provide to the remote driving station an indication of the selected state of the configurable visual indicator to enable the remote driving station to detect a malfunction in the sensor data stream, and
    obtain an observation of the state of the configurable visual indicator, based on the sensor data stream, and determine whether the observation and the selected state of the configurable visual indicator are consistent, to detect a malfunction in the sensor data stream,
  wherein the apparatus is a remotely operated vehicle, or is configured to be installed in a remotely operated vehicle.

Clause 2. The apparatus according to Clause 1, wherein the apparatus is further configured to provide to the remote driving station a timestamp, to receive from the remote driving station a second timestamp, and to determine, based on comparing the timestamp to the second timestamp, whether a connection between the apparatus and the remote driving station fulfils a latency criterion.

Clause 3. The apparatus according to Clause 1 or 2, wherein the apparatus is further configured to provide to the remote driving station an identity of the apparatus, to receive from the remote driving station a second identity in connection with the operating instructions, and to determine, based on comparing the identity to the second identity, whether the operating instructions relate to the apparatus.

Clause 4. The apparatus according to Clause 3, wherein the apparatus is further configured to calculate a checksum over the indication of the selected state of the configurable visual indicator, the timestamp and the identity of the apparatus, and to provide the checksum to the remote driving station.

Clause 5. The apparatus according to any of Clauses 1-4, wherein the apparatus is configured to obtain the observation of the state of the configurable visual indicator by receiving it from the remote driving station.

Clause 6. The apparatus according to any of Clauses 1-4, wherein the apparatus is configured to obtain the observation of the state of the configurable visual indicator by scanning, in the apparatus, the sensor data stream, wherein the apparatus is configured to provide to the remote driving station a nonce embedded in the sensor data stream, and to verify that a scanned nonce received from the remote driving station matches the nonce provided in the sensor data stream.

Clause 7. The apparatus according to any of Clauses 1-6, wherein the video sensor is further arranged to include in the sensor data stream a representation of a view from the remotely operated vehicle.

Clause 8. The apparatus according to any of Clauses 1-7, wherein the remotely operated vehicle is an autonomous vehicle configured to be operated in a remotely operable mode.

Clause 9. An apparatus comprising at least one processing core, at least one memory including computer program code, and the computer program code being configured to, with the at least one processing core, cause the apparatus at least to:
perform as a remote driving station to a remotely operated vehicle by providing operating instructions to the remotely operated vehicle;
receive from the remotely operated vehicle a sensor data stream, render the sensor data stream on a display and at least one of:
receive an indication of a selected state of a configurable visual indicator in the remotely operated vehicle, provide a visual signal based on the indication of the selected state of the configurable visual indicator, to enable an operator to detect a malfunction in the sensor data stream, the sensor data stream being dependent on an actual state of the configurable visual indicator, and
image at least a part of the display to generate image data, digitize the image data and provide to the remotely operated vehicle an indication of the digitization.

Clause 10. The apparatus according to Clause 9, wherein the apparatus is configured to provide to the remotely operated vehicle at least one of a timestamp received from the remotely operated vehicle and an identity of the remotely operated vehicle, received in the apparatus from the remotely operated vehicle.

Clause 11. The apparatus according to Clause 9 or 10, wherein the indication of the digitization indicates either a state of the configurable visual indicator as rendered on the display based on the sensor data stream, or a nonce as rendered on the display based on the sensor data stream.

Clause 12. A method comprising:
operating, in an apparatus, a configurable visual indicator and a video sensor arranged to generate a sensor data stream which is dependent on a state of the configurable visual indicator;
selecting the state of the configurable visual indicator, processing operating instructions received in the apparatus from a remote driving station, providing to the remote driving station the sensor data stream and at least one of:
providing to the remote driving station an indication of the selected state of the configurable visual indicator, to enable the remote driving station to detect a malfunction in the sensor data stream, and
obtaining an observation of the state of the configurable visual indicator, based on the sensor data stream, and determining whether the observation and the selected state of the configurable visual indicator are consistent, to detect a malfunction in the sensor data stream,
wherein the apparatus is a remotely operated vehicle, or is configured to be installed in a remotely operated vehicle.

Clause 13. The method according to Clause 12, wherein the method further comprises providing to the remote driving station a timestamp, receiving from the remote driving station a second timestamp, and determining, based on comparing the timestamp to the second timestamp, whether a connection between the apparatus and the remote driving station fulfils a latency criterion.

Clause 14. The method according to Clause 12 or 13, wherein the method further comprises providing to the remote driving station an identity of the apparatus, receiving from the remote driving station a second identity in connection with the operating instructions, and determining, based on comparing the identity to the second identity, whether the operating instructions relate to the apparatus.

Clause 15. The method according to any of Clause 12-14, wherein the method further comprises obtaining the observation of the state of the configurable visual indicator by receiving it from the remote driving station.

Clause 16. The method according to any of Clauses 12-14, wherein the method comprises obtaining the observation of the state of the configurable visual indicator by scanning, in the apparatus, the sensor data stream, providing to the remote driving station a nonce embedded in the sensor data stream, and verifying that a scanned nonce received from the remote driving station matches the nonce provided in the sensor data stream.

Clause 17. The method according to any of Clauses 12-16, wherein the method comprises including, by the video sensor, in the sensor data stream a representation of a view from the remotely operated vehicle.

Clause 18. The method according to any of Clauses 12-17, wherein the remotely operated vehicle is any of a planetary rover, a bomb disarming vehicle, a vehicle furnished with nuclear reactor maintenance devices, freight moving vehicles, such as a truck or a tractor unit for a trailer, a car, such as a taxi, or a van configured to be remotely driven.

Clause 19. A method comprising:
performing, by an apparatus, as a remote driving station to a remotely operated vehicle by providing operating instructions to the remotely operated vehicle,
receiving from the remotely operated vehicle a sensor data stream, rendering the sensor data stream on a display and at least one of:
receiving an indication of a selected state of a configurable visual indicator in the remotely operated vehicle, providing a visual signal based on the indication of the selected state of the configurable visual indicator, to enable an operator to detect a malfunction in the sensor data stream, the sensor data stream being dependent on an actual state of the configurable visual indicator, and
imaging at least a part of the display to generate image data, digitizing the image data and providing to the remotely operated vehicle an indication of the digitization.

Clause 20. The method according to Clause 19, wherein the method comprises providing to the remotely operated vehicle at least one of a timestamp received from the remotely operated vehicle and an identity of the remotely operated vehicle, received in the apparatus from the remotely operated vehicle.

Clause 21. The method according to Clause 19 or 20, wherein the indication of the digitization indicates either a state of the configurable visual indicator as rendered on the display based on the sensor data stream, or a nonce as rendered on the display based on the sensor data stream.

Clause 22. A non-transitory computer readable medium having stored thereon a set of computer readable instructions that, when executed by at least one processor, cause an apparatus to at least:
operate a configurable visual indicator and a video sensor arranged to generate a sensor data stream which is dependent on a state of the configurable visual indicator;
select the state of the configurable visual indicator, process operating instructions received in the apparatus from a remote driving station, provide to the remote driving station the sensor data stream and at least one of:
provide to the remote driving station an indication of the selected state of the configurable visual indicator, to enable the remote driving station to detect a malfunction in the sensor data stream, and
obtain an observation of the state of the configurable visual indicator, based on the sensor data stream, and determine whether the observation and the selected state of the configurable visual indicator are consistent, to detect a malfunction in the sensor data stream,
wherein the apparatus is a remotely operated vehicle, or is configured to be installed in a remotely operated vehicle.

Clause 23. A non-transitory computer readable medium having stored thereon a set of computer readable instructions that, when executed by at least one processor, cause an apparatus to at least:
perform as a remote driving station to a remotely operated vehicle by providing operating instructions to the remotely operated vehicle;
receive from the remotely operated vehicle a sensor data stream, render the sensor data stream on a display and at least one of:
receive an indication of a selected state of a configurable visual indicator in the remotely operated vehicle, provide a visual signal based on the indication of the selected state of the configurable visual indicator, to enable an operator to detect a malfunction in the sensor data stream, the sensor data stream being dependent on an actual state of the configurable visual indicator, and
image at least a part of the display to generate image data, digitize the image data and provide to the remotely operated vehicle an indication of the digitization.

What is claimed is:

1. An apparatus comprising:
a configurable visual indicator and a video sensor arranged to generate a sensor data stream which is dependent on a state of the configurable visual indicator; and
control circuitry configured to select the state of the configurable visual indicator, to process operating instructions received in the apparatus from a remote driving station, to provide to the remote driving station the sensor data stream and to at least one of:
provide to the remote driving station an indication of the selected state of the configurable visual indicator to enable the remote driving station to detect a malfunction in the sensor data stream; and
obtain an observation of the state of the configurable visual indicator, based on the sensor data stream, and determine whether the observation and the selected state of the configurable visual indicator are consistent, to detect a malfunction in the sensor data stream,
wherein the apparatus is a remotely operated vehicle, or is configured to be installed in a remotely operated vehicle.

2. The apparatus according to claim 1,
wherein the apparatus is further configured to provide to the remote driving station a timestamp, to receive from the remote driving station a second timestamp, and to determine, based on comparing the timestamp to the second timestamp, whether a connection between the apparatus and the remote driving station fulfils a latency criterion.

3. The apparatus according to claim 1,
wherein the apparatus is further configured to provide to the remote driving station an identity of the apparatus, to receive from the remote driving station a second identity in connection with the operating instructions, and to determine, based on comparing the identity to the second identity, whether the operating instructions relate to the apparatus.

4. The apparatus according to claim 3,
wherein the apparatus is further configured to calculate a checksum over the indication of the selected state of the configurable visual indicator, the timestamp and the identity of the apparatus, and to provide the checksum to the remote driving station.

5. The apparatus according to claim 1,
wherein the apparatus is configured to obtain the observation of the state of the configurable visual indicator by receiving it from the remote driving station.

6. The apparatus according to claim 1,
wherein the apparatus is configured to obtain the observation of the state of the configurable visual indicator by scanning, in the apparatus, the sensor data stream, wherein the apparatus is configured to provide to the remote driving station a nonce embedded in the sensor data stream, and to verify that a scanned nonce received from the remote driving station matches the nonce provided in the sensor data stream.

7. The apparatus according to claim 1,
wherein the video sensor is further arranged to include in the sensor data stream a representation of a view from the remotely operated vehicle.

8. The apparatus according to claim 1,
wherein the remotely operated vehicle is an autonomous vehicle configured to be operated in a remotely operable mode.

9. A method comprising:
operating, in an apparatus, a configurable visual indicator and a video sensor arranged to generate a sensor data stream which is dependent on a state of the configurable visual indicator; and
selecting the state of the configurable visual indicator, processing operating instructions received in the apparatus from a remote driving station, providing to the remote driving station the sensor data stream and at least one of:
providing to the remote driving station an indication of the selected state of the configurable visual indicator, to enable the remote driving station to detect a malfunction in the sensor data stream; and
obtaining an observation of the state of the configurable visual indicator, based on the sensor data stream, and determining whether the observation and the selected state of the configurable visual indicator are consistent, to detect a malfunction in the sensor data stream,
wherein the apparatus is a remotely operated vehicle, or is configured to be installed in a remotely operated vehicle.

10. The method according to claim 9, further comprising:
providing to the remote driving station a timestamp, receiving from the remote driving station a second timestamp, and determining, based on comparing the timestamp to the second timestamp, whether a connection between the apparatus and the remote driving station fulfils a latency criterion.

11. The method according to claim 9, further comprising:
providing to the remote driving station an identity of the apparatus, receiving from the remote driving station a second identity in connection with the operating instructions, and determining, based on comparing the identity to the second identity, whether the operating instructions relate to the apparatus.

12. The method according to claim 11, further comprising:
calculating a checksum over the indication of the selected state of the configurable visual indicator, the timestamp and the identity of the apparatus, and to provide the checksum to the remote driving station.

13. The method according to claim 9, further comprising:
obtaining the observation of the state of the configurable visual indicator by receiving it from the remote driving station.

14. The method according to claim 9, further comprising:
obtain the observation of the state of the configurable visual indicator by scanning, in the apparatus, the sensor data stream, wherein the apparatus is configured to provide to the remote driving station a nonce embedded in the sensor data stream, and to verify that a scanned nonce received from the remote driving station matches the nonce provided in the sensor data stream.

15. The method according to claim 9,
wherein the sensor data stream includes a representation of a view from the remotely operated vehicle.

16. The method according to claim 9,
wherein the remotely operated vehicle is an autonomous vehicle configured to be operated in a remotely operable mode.

17. A non-transitory computer readable medium having stored thereon a set of computer readable instructions that, when executed by at least one processor, cause an apparatus to at least:
operate a configurable visual indicator and a video sensor arranged to generate a sensor data stream which is dependent on a state of the configurable visual indicator; and
select the state of the configurable visual indicator, process operating instructions received in the apparatus from a remote driving station, provide to the remote driving station the sensor data stream and at least one of:
provide to the remote driving station an indication of the selected state of the configurable visual indicator, to enable the remote driving station to detect a malfunction in the sensor data stream, and
obtain an observation of the state of the configurable visual indicator, based on the sensor data stream, and determine whether the observation and the selected state of the configurable visual indicator are consistent, to detect a malfunction in the sensor data stream,
wherein the apparatus is a remotely operated vehicle, or is configured to be installed in a remotely operated vehicle.

18. The non-transitory computer readable medium according to claim 17, wherein the set of computer readable instructions, when executed by the at least one processor, further causes the apparatus to:
provide to the remote driving station an identity of the apparatus, receive from the remote driving station a second identity in connection with the operating instructions, and determine, based on comparing the identity to the second identity, whether the operating instructions relate to the apparatus; and
calculate a checksum over the indication of the selected state of the configurable visual indicator, the timestamp and the identity of the apparatus, and provide the checksum to the remote driving station.

19. The non-transitory computer readable medium according to claim 17, wherein the set of computer readable instructions, when executed by the at least one processor, further causes the apparatus to:
obtain the observation of the state of the configurable visual indicator by scanning, in the apparatus, the sensor data stream, provide to the remote driving station a nonce embedded in the sensor data stream, and verify that a scanned nonce received from the remote driving station matches the nonce provided in the sensor data stream.

20. The non-transitory computer readable medium according to claim 17,
wherein the sensor data stream includes a representation of a view from the remotely operated vehicle.

* * * * *